United States Patent
Li et al.

(10) Patent No.: US 9,546,320 B2
(45) Date of Patent: Jan. 17, 2017

(54) QUANTUM DOT FILM APPLIED TO BACKLIGHT MODULE

(71) Applicants: Gang Li, Zhejiang (CN); Lun Li, Zhejiang (CN); Zhipeng Liu, Zhejiang (CN); Haijiang Tang, Zhejiang (CN); Yan Zhang, Zhejiang (CN)

(72) Inventors: Gang Li, Zhejiang (CN); Lun Li, Zhejiang (CN); Zhipeng Liu, Zhejiang (CN); Haijiang Tang, Zhejiang (CN); Yan Zhang, Zhejiang (CN)

(73) Assignee: Ningbo Exciton Technology Co., Ltd., Ningbo (CN)

( * ) Notice: Subject to any disclaimer, the term of this patent is extended or adjusted under 35 U.S.C. 154(b) by 171 days.

(21) Appl. No.: 14/659,339

(22) Filed: Mar. 16, 2015

(65) Prior Publication Data
US 2015/0260373 A1    Sep. 17, 2015

(30) Foreign Application Priority Data
Mar. 14, 2014    (CN) .......................... 2014 1 0096164

(51) Int. Cl.
*C09K 11/88* (2006.01)
*C09K 11/56* (2006.01)
(Continued)

(52) U.S. Cl.
CPC .............. *C09K 11/88* (2013.01); *C09K 11/565* (2013.01); *C09K 11/70* (2013.01); *G02F 2001/133614* (2013.01)

(58) Field of Classification Search
CPC ....... C09K 11/88; C09K 11/565; C09K 11/70; G02F 2001/133614
See application file for complete search history.

(56) References Cited

U.S. PATENT DOCUMENTS

| 2012/0113672 A1* | 5/2012 | Dubrow ................. B82Y 20/00 362/602 |
| 2014/0284549 A1* | 9/2014 | Liu ........................ C09D 11/52 257/13 |
| 2015/0021521 A1* | 1/2015 | Nick ...................... C09K 11/02 252/301.36 |

FOREIGN PATENT DOCUMENTS

| CN | 102690658 A | 9/2012 |
| CN | 102980136 A | 3/2013 |

(Continued)

*Primary Examiner* — Mary Ellen Bowman
(74) *Attorney, Agent, or Firm* — Weisun Rao; Greenberg Traurig, LLP

(57) ABSTRACT

The invention relates to the optical films, in particular to a quantum dot film applied to a backlight module. The quantum dot film aims to solve the problem that the color saturation of a liquid crystal displayer is poor. The novel quantum dot film comprises a quantum dot layer, and an upper waterproof layer and a lower waterproof layer are arranged on the upper surface of the quantum dot layer and the lower surface of the quantum dot layer respectively. The quantum dot layer comprises, by weight, 100 parts of adhesives, 5-20 parts of silica gel particles, 1-20 parts of diffusion particles and 0.1-20 parts of quantum dots. The surface of the silica gel particles is provided with a micropore structure. The quantum dots are adsorbed in micropores of the silica gel particles or dispersed in the adhesives. The silica gel particles and the diffusion particles are dispersed in the adhesives. The quantum dot film is applied to the backlight module and has the advantages of improving the color gamut and illuminance.

10 Claims, 1 Drawing Sheet

Figure 1:
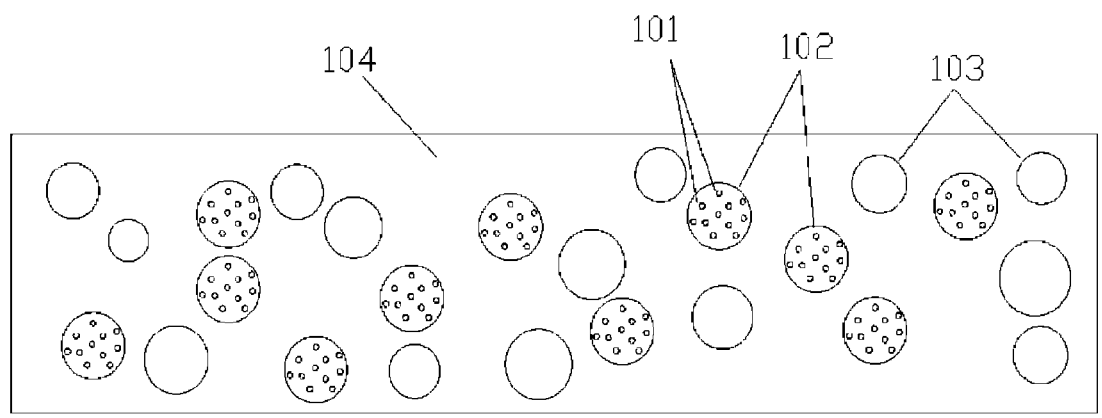

(51) Int. Cl.
*C09K 11/70* (2006.01)
*G02F 1/1335* (2006.01)

(56) References Cited

FOREIGN PATENT DOCUMENTS

| CN | 10341255 A | 11/2013 |
| CN | 103487857 A | 1/2014 |

* cited by examiner

QUANTUM DOT FILM APPLIED TO BACKLIGHT MODULE

CROSS-REFERENCE TO RELATED APPLICATION

This application claims priority to Chinese application number 201410096164.9, filed on Mar. 14, 2014, the contents of which are incorporated herein in their entireties.

FIELD OF THE INVENTION

The present invention relates to optical films, particularly to a quantum dot film applied to the backlight module.

BACKGROUND OF THE INVENTION

The backlight module is provider of light source for the liquid crystal display (LCD). All the colors showed by the liquid crystal display are derived from the light emitted by the backlight module. Currently commercially available light sources in the backlight module are mainly divided into two types, i.e., cold cathode fluorescent lamp (CCFL) and light emitting diode (LED). Compared the two light sources, LEDs have obvious advantages in the aspects of energy saving, environmental protection, small size, long life, and so on. As the cold cathode fluorescent lamp contains mercury, it not only results in high cost but also harms the environment greatly. To protect the environment, gradually replacing cold cathode fluorescent lamp with LEF will be an inevitable result. But, for the color saturation showed by the liquid crystal display, the light emitted from the cold cathode fluorescent lamp has good color saturation, and the color saturation of ordinary white LEDs is relatively poor. Therefore, it is very important to improve the color saturation of the liquid crystal display with LED light source.

The color saturation of LCD is usually shown with the NTSC color gamut which is the sum of color shown by the display under the NTSC standard. The color gamut of ordinary white light LED is 68-70% NTSC, it is very negative for the color performance of display. Currently there are two main ways to improve the color gamut of LED. The first method requires use of many LED light sources which are able to emit different colors to make color saturation exceeding 90% NTSC color gamut. Due to the higher costs of the LED light sources with different colors, the working life of the LED light sources are uneven. As a result, this method cannot be universally used. The second method requires use of ordinary white LED which emits mainly blue light. By using quantum dots, a portion of the blue light is converted into red light and green light. Compared with the white light emitted by the traditional LED, more red, green, and blue light goes through the filter and therefore displaying brighter, richer colors. But as the cost of quantum dot is higher, this method requires consideration of the light conversion efficiency of the quantum dots, stability, and other factors.

BRIEF SUMMARY OF THE INVENTION

In order to solve the problem of poor color saturation of the liquid crystal display, the present invention provides a novel quantum dot film which can be applied to the backlight module. The quantum dot film of this invention has the advantages of improving the color gamut and increasing brightness.

The quantum dot film comprises a quantum dot layer having an upper surface and a lower surface, an upper waterproof layer and a lower waterproof layer which are on the upper surface and the lower surface of the quantum dot layer respectively. The quantum dot layer comprises, by weight, 100 parts of an adhesive, 5-20 parts of silica gel particles, 1-20 parts of diffusion particles, and 0.1-20 parts of quantum dots. The surfaces of the silica gel particles have micropore structures; the quantum dots are adsorbed in micropores of the silica gel particles or dispersed in the adhesive; the silica gel particles and the diffusion particles are dispersed in the adhesives.

Preferably, the quantum dot layer comprises, by weight, 100 parts of an adhesive, 5-20 parts of silica gel particles, 5-15 parts of diffusion particles and 9-11 parts of quantum dots.

Preferably, in the quantum dot layer, the weight of the quantum dot adsorbed in the micropore of the silica gel particles is 60-100% of the weight of all the quantum dots in the quantum dot layer.

Preferably, in the quantum dot layer, the weight of the quantum dot adsorbed in the micropore of the silica gel particles is 80-100% of the weight of all the quantum dots in the quantum dot layer.

Depending on the kind and luminous efficiency of quantum dots, an appropriate amount of quantum dots can be added into the above-mentioned quantum dot layer.

Further, the quantum dot material is selected from one kind of semiconductor material, or a mixture of two or more kinds of semiconductor materials.

The semiconductor material comprises a Group IIB-VIB element, or a Group IIIB-VIB element. The Group IIB-VIB element comprises CdS, CdSe, CdTe and ZnSe. The group IIIB-VB element comprises InP and InAs.

Further, the particle size of the silica gel particles is 2-30 μm, the pore size of the micropore structure on the surface of the silica gel particle is 10-30 nm, the particle size of the quantum dots is 1-20 nm. Preferably, the particle size of the silica gel particles is 18-20 μm, the pore size of the micropore structure on the surface of the silica gel particle is 12-20 nm. Preferably, the particle size of the quantum dots is 2-9 nm.

The silica gel particles may adsorb quantum dots in the micropores. When the light is refracted repeatedly in the micropores, the quantum dots may convert the light to the light with required wavelength. Micropores structure can significantly improve the luminous efficiency of quantum dots.

Further, the quantum dots comprise the red light quantum dots and green light quantum dots, the weight ratio of the red light quantum dots and the green light quantum dots is 1:1-1:15.

Preferably, the weight ratio of the red light quantum dots and the green light quantum dots is 1:2-1:10, or 1:3-1:6. More preferably, the weight ratio of the red light quantum dots and the green light quantum dots is 2:7-2:9.

The particle size range of the red light quantum dots is 6-9 nm, the particle size range of the green light quantum dots is 2-5 nm.

The red light quantum dot material is selected from CdS, CdSe, CdTe, ZnSe, InP, InAs, or a mixture of two or more these materials. The green light quantum dot material is selected from CdS, CdSe, CdTe, ZnSe, InP, InAs, or a mixture of two or more these materials.

Depending on the different light emitted from different backlight source, to adjust the weight ratio of the quantum dot of different types, such as, for the most common white LED which emits blue light mainly, one can adjust the red and green light quantum dots to obtain the desired mixed light.

The emission spectrum of the quantum dot is determined by the size of quantum dots (main factor) and its chemical composition, so the quantum dot of different components can emit light with different wavelengths by controlling the size of the quantum dot.

The wavelength of the light emitted by the quantum dots which are illuminated by the light source, is mainly determined by the particle size of the quantum dots. Based on the need, one can adjust the size of quantum dots to obtain red light quantum dots or green light quantum dots. Adjusting the weight ratio of the red light quantum dots and green light quantum dots can result in light with different wavelengths (different colors), thereby the desired mixed light desired.

Further, the diffusion particles are spherical or ellipsoid shape, the particle size range of the diffusion particles is 3-35 μm; the particle size of the diffusion particles is the same, or the variation coefficient of the particle size of the diffusion particles is less than or equal to 15%.

The diffusion particles are made of one or more materials selected from the group of polymethyl methacrylate (PMMA), polybutyl methacrylate, polystyrene, silicone resin, titanium dioxide, calcium carbonate, and barium sulfate.

Further, the diffusion particles are made of PMMA or titanium dioxide, with the particle size of 5-20 μm.

The adhesive is made of one or more materials selected from polystyrene resin, polymethyl methacrylate (PMMA), acrylic resin, urethane resin, and epoxy resin.

Further, the thickness of the quantum dot layer is 10-200 μm. Further, the thickness of the quantum dot layer is 150-200 μm.

Further, the present invention provides a quantum dot film for application to the backlight module, which comprises, by weight, 2 parts of red light quantum dots, 7-9 parts of green light quantum dots, 5-20 parts of silica gel particles, 5-15 parts of diffusion particles, 100 parts of polystyrene resin or polymethyl methacrylate. The particle size of the red light quantum dots is 6-9 nm. The particle size of the green light quantum dots is 2-5 nm. The particle size of said silica gel particles is 18-20 μm, the pore size of the micropore structure on the surface of the silica gel particle is 12-20 nm. The diffusion particles are made of PMMA or titanium dioxide with the particle size of 5-20 μm. The thickness of the prepared quantum dot layer is 150-200 μm. The waterproof layers are arranged on the upper surface and lower surface of the quantum dot layer, the waterproof layer is coating with a protective coating layer.

The present invention also provides a backlight module which comprises an above-described quantum dot film.

Further, the upper surface of the upper waterproof layer is equipped with protective coating layer, anti-dazzle structure, prism structure or diffusion layer; the lower surface of the lower waterproof layer is also equipped with protective coating layer, the lower surface of this protective coating layer has irregular protrusions of 1-10 μm.

The waterproof layer comprises one or more layers of thin film which can prevent a gas (vapor) to pass through. The thin film can comprise, e.g., PVA coated high barrier film, polyvinylidene chloride film (PVDC), ethylene/vinyl alcohol copolymer film (EOVH), nylon material, an inorganic oxide coated film. In general, the thickness of the waterproof layer is 10-100 μm.

The thickness of the protective coating layer is 4-12 μm, the material is selected from acrylic resin, urethane resin, or epoxy resin, or mixture of two above materials. The protective coating layer contains 0.1%-10% by weight of the diffusion particles with particle size of 1-10 μm. The material of the diffusion particles in the protective coating layer is the same as or different from the material of diffusion particles in quantum dot layer.

Further, the material of waterproof layer is PVA coated high barrier film or polyvinylidene chloride film (PVDC), the thickness of the waterproof layer is 20-40 μm. Further, the material of the protective coating layer is acrylic resin, the thickness of the protective coating layer is 10-12 μm, the protective coating layer contains 5%-10% by weight of the diffusion particles with particle size of 5-10 μm.

The anti-dazzle structure, prism structure and diffusion layer may be prepared by the method in prior art, or may be the product purchased on the market.

The present invention also provides a method for preparing the above-described quantum dot film, and the method comprises the following steps:

(1) mixing the silica gel particles and quantum dots;

(2) adding the mixture of silica gel particles and quantum dots obtained in step (1) into the adhesive to obtain an adhesive mixture, then adding diffusion particles into the adhesive mixture and further mixing to give an adhesive coating liquid;

(3) applying the adhesive coating liquid obtained in step (2) onto the upper surface of the lower waterproof layer, which is cured to form a quantum dot layer;

(4) bonding the upper waterproof layer onto the upper surface of the quantum dot layer.

In the quantum dot film of the present invention, the surface of the silica gel particles dispersed in the film has micropores structure, the quantum dots can be adsorbed in the micropores, when the light pass through the film, the light in the micropores of the silica gel particles are refracted constantly, to improve the utilization of quantum dots. In practical applications, equivalent to just adding a small amount of quantum dots, we can achieve excellent luminous efficiency and greatly improves the luminous efficiency of quantum dots.

Since the diffusion particles and silica gel particles both have the advantages of atomizing the light source, and improving the brightness of front face, the quantum dot film of the present invention improve the color gamut, and improve the brightness at the same time, the quantum dot film can substitute the diffusion film in the backlight module, saving cost.

BRIEF DESCRIPTIONS OF THE DRAWINGS

Figure 2:
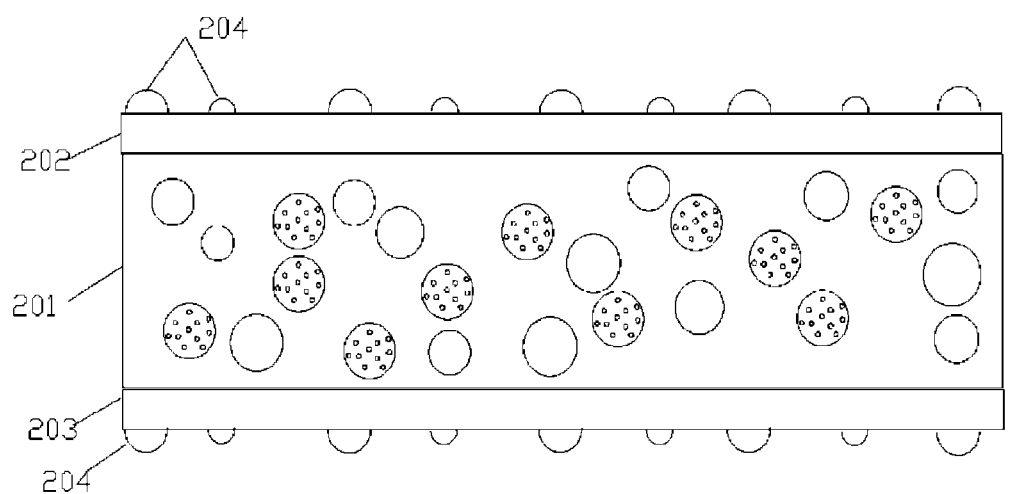

FIG. 1 is a structural schematic view of the quantum dot layer in the quantum dot film provided by the present invention;

FIG. 2 is a schematic view of the structure of quantum dot film with protective coating layer provided by the present invention, wherein, 102 is the silica gel particles, 101 is quantum dots adsorbed on the silica gel particles, 103 is diffusion particles, 104 is the adhesive; 201 is the quantum dot layer; 202, 203 are upper and lower waterproof layer respectively, 204 is the protective coating layer.

DETAILED DESCRIPTION OF THE INVENTION

As shown in FIG. 1, the quantum dot layer in the quantum dot film provided by the present invention comprise silica gel particles 102, quantum dots 101, some quantum dots 101 are adsorbed in the micropores of silica gel particles 102, diffusion particles 103 and the adhesive 104.

As shown in FIG. 2, the quantum dot film with protective coating layer provided by the present invention comprises quantum dot layer 201, an upper waterproof layer 202 and a lower waterproof layer 203 are arranged on the upper surface and the lower surface of the quantum dot layer 201 respectively; the upper surface of the upper waterproof layer is also provided with a protective coating layer, the lower surface of the lower waterproof layer is also provided with a protective coating layer 204.

The present invention provides the following method to test the performance of the quantum dot film:

Brightness test: Take a quantum dot film of 32-inch, the quantum dot film is placed in a backlight module of 32-inch, lights at the rated voltage of 24V, measure the brightness and viewing angle with a luminance meter (produced by Suzhou Fushida Scientific Instrument Co., LTD. Model: BH-7).

Color gamut test: Take a quantum dot film of 32-inch, the quantum dot film is placed in a backlight module of 32-inch, the display is adjusted to the working state required, then, all of the red, green and blue signals are input to the display, test the chromaticity coordinates of the center point with a brightness meter (Model: BH-7) respectively, the NTSC value is calculated by the fixed formula.

Example 1

The present invention provides a quantum dot film applied to the backlight module, comprises, by weight, 2 parts of red light quantum dots, 8 parts of green light quantum dots, 15 parts of silica gel particles, 10 parts of diffusion particles, 100 parts of polystyrene resin. The particle size of the red light quantum dots is 6 nm. The particle size of the green light quantum dots is 2 nm. The particle size of said silica gel particles is 18 µm, the pore size of the micropore structure on the surface of the silica gel particle is 15 nm. The diffusion particles are PMMA with the particle size of 20 µm. The thickness of the prepared quantum dot layer is 150 µm. The waterproof layers are arranged on the upper and lower surface of the quantum dot layer, the waterproof layer is coating with protective coating layer. The waterproof layer is polyvinylidene chloride film (PVDC), the thickness of the waterproof layer is 20 µm. The material of the protective coating layer is acrylic resin, the thickness of the protective coating layer is 10-12 µm, the protective coating layer contains 5% by weight of the diffusion particles with particle size of 5-8 µm.

Example 2

The present invention provides a quantum dot film applied to the backlight module, comprises, by weight, 2 parts of red light quantum dots, 8 parts of green light quantum dots, 5 parts of silica gel particles, 15 parts of diffusion particles, 100 parts of polystyrene resin. The particle size of the red light quantum dots is 8 nm. The particle size of the green light quantum dots is 3 nm. The particle size of said silica gel particles is 20 µm, the pore size of the micropore structure on the surface of the silica gel particle is 12 nm. The diffusion particles are PMMA with the particle size of 20 µm. The thickness of the prepared quantum dot layer is 150 µm. The waterproof layers are arranged on the upper and lower surface of the quantum dot layer, the waterproof layer is coating with protective coating layer. The waterproof layer is polyvinylidene chloride film (PVDC), the thickness of the waterproof layer is 40 µm. The material of the protective coating layer is acrylic resin, the thickness of the protective coating layer is 10-12 µm, the protective coating layer contains 10% by weight of the diffusion particles with particle size of 8-10 µm.

Example 3

The present invention provides a quantum dot film applied to the backlight module, comprises, by weight, 2 parts of red light quantum dots, 8 parts of green light quantum dots, 20 parts of silica gel particles, 5 parts of diffusion particles, 100 parts of polymethyl methacrylate. The particle size of the red light quantum dots is 9 nm. The particle size of the green light quantum dots is 5 nm. The particle size of said silica gel particles is 20 µm, the pore size of the micropore structure on the surface of the silica gel particle is 20 nm. The diffusion particles are titanium dioxide with the particle size of 5 µm. The thickness of the prepared quantum dot layer is 150 µm. The waterproof layers are arranged on the upper and lower surface of the quantum dot layer, the waterproof layer is coating with protective coating layer. The waterproof layer is polyvinylidene chloride film (PVDC), the thickness of the waterproof layer is 30 µm. The material of the protective coating layer is acrylic resin, the thickness of the protective coating layer is 10-12 µm, the protective coating layer contains 8% by weight of the diffusion particles with particle size of 6-9 µm.

Example 4

The present invention provides a quantum dot film applied to the backlight module, comprises, by weight, 0.02 parts of red light quantum dots, 0.08 parts of green light quantum dots, 5 parts of silica gel particles, 1 parts of diffusion particles, 100 parts of acrylic resin. The particle size of the red light quantum dots is 6 nm. The particle size of the green light quantum dots is 2 nm. The particle size of said silica gel particles is 2 µm, the pore size of the micropore structure on the surface of the silica gel particle is 10 nm. The diffusion particles are polybutyl methacrylate with the particle size of 3 µm. Almost all the quantum dots are absorbed in the micropore structure of the silica gel particle. The thickness of the prepared quantum dot layer is 10 µm. The waterproof layers are arranged on the upper and lower surface of the quantum dot layer, the waterproof layer is coating with protective coating layer. The waterproof layer is ethylene/vinyl alcohol copolymer film (EOVH), the thickness of the waterproof layer is 10 µm. The material of the protective coating layer is acrylic resin, the thickness of the protective coating layer is 4-12 µm, the protective coating layer contains 1% by weight of the diffusion particles with particle size of 1-5 µm.

Example 5

The present invention provides a quantum dot film applied to the backlight module, comprises, by weight, 3 parts of red light quantum dots, 8 parts of green light quantum dots, 12 parts of silica gel particles, 10 parts of diffusion particles, 100 parts of polystyrene resin. The particle size of the red light quantum dots is 8 nm. The particle size of the green light quantum dots is 3 nm. The particle size of said silica gel particles is 15 µm, the pore size of the micropore structure on the surface of the silica gel particle is 20 nm. The diffusion particles are polystyrene with the particle size of 20 µm. The weight of the quantum dot adsorbed in the micropore of the silica gel particles is about 60% of the weight of all the quantum dot in the quantum dot layer. The thickness of the prepared quantum dot layer is 120 μm. The waterproof layer are arranged on the upper and lower surface of the quantum dot layer, the waterproof layer is coating with protective coating layer. The waterproof layer is nylon material, the thickness of the waterproof layer is 50 μm. The material of the protective coating layer is urethane resin, the thickness of the protective coating layer is 4-12 μm, the protective coating layer contains 2% by weight of the diffusion particles with particle size of 5-8 μm.

Example 6

The present invention provides a quantum dot film applied to the backlight module, comprises, by weight, 4 parts of red light quantum dots, 16 parts of green light quantum dots, 20 parts of silica gel particles, 20 parts of diffusion particles, 100 parts of polymethyl methacrylate. The particle size of the red light quantum dots is 9 nm. The particle size of the green light quantum dots is 5 nm. The particle size of said silica gel particles is 30 μm, the pore size of the micropore structure on the surface of the silica gel particle is 30 nm. The diffusion particles are silicone resin with the particle size of 20-35 μm, the variation coefficient of the particle size of the diffusion particles is 15%. The weight of the quantum dot adsorbed in the micropore of the silica gel particles is 90% of the weight of all the quantum dot in the quantum dot layer. The thickness of the prepared quantum dot layer is 200 μm. The waterproof layer are arranged on the upper and lower surface of the quantum dot layer, the waterproof layer is coating with protective coating layer. The waterproof layer is ethylene/vinyl alcohol copolymer film, the thickness of the waterproof layer is 100 μm. The material of the protective coating layer is epoxy resin, the thickness of the protective coating layer is 4-12 μm, the protective coating layer contains 10% by weight of the diffusion particles with particle size of 5-10 μm.

Example 7

The present invention provides a quantum dot film applied to the backlight module, comprises, by weight, 2 parts of red light quantum dots, 7 parts of green light quantum dots, 10 parts of silica gel particles, 6 parts of diffusion particles, 100 parts of polystyrene resin. The particle size of the red light quantum dots is 8 nm. The particle size of the green light quantum dots is 3 nm. The particle size of said silica gel particles is 18 μm, the pore size of the micropore structure on the surface of the silica gel particle is 20 nm. The diffusion particles are PMMA with the particle size of 20 μm. The weight of the quantum dot adsorbed in the micropore of the silica gel particles is about 80% of the weight of all the quantum dot in the quantum dot layer. The thickness of the prepared quantum dot layer is 150 μm. The waterproof layer are arranged on the upper and lower surface of the quantum dot layer, the waterproof layer is coating with protective coating layer. The waterproof layer is PVA coated high barrier film, the thickness of the waterproof layer is 20 μm. The material of the protective coating layer is acrylic resin, the thickness of the protective coating layer is 10-12 μm, the protective coating layer contains 6% by weight of the diffusion particles with particle size of 5-10 μm.

Example 8

The present invention provides a quantum dot film applied to the backlight module, comprises, by weight, 2 parts of red light quantum dots, 9 parts of green light quantum dots, 14 parts of silica gel particles, 8 parts of diffusion particles, 100 parts of polymethyl methacrylate. The particle size of the red light quantum dots is 6-9 nm. The particle size of the green light quantum dots is 2-5 nm. The particle size of said silica gel particles is 20 μm, the pore size of the micropore structure on the surface of the silica gel particle is 15 nm. The diffusion particles are polymethyl methacrylate with the particle size of 15 μm. The thickness of the prepared quantum dot layer is 200 μm. The waterproof layers are arranged on the upper and lower surface of the quantum dot layer, the waterproof layer is coating with protective coating layer. The waterproof layer is polyvinylidene chloride film, the thickness of the waterproof layer is 40 μm. The material of the protective coating layer is acrylic resin, the thickness of the protective coating layer is 10-12 μm, the protective coating layer contains 10% by weight of the diffusion particles with particle size of 5-10 μm.

Example 9

The present invention provides a quantum dot film applied to the backlight module, comprises, by weight, 2 parts of red light quantum dots, 8 parts of green light quantum dots, 16 parts of silica gel particles, 6 parts of diffusion particles, 100 parts of polystyrene resin. The particle size of the red light quantum dots is 6-9 nm. The particle size of the green light quantum dots is 2-5 nm. The particle size of said silica gel particles is 20 μm, the pore size of the micropore structure on the surface of the silica gel particle is 30 nm. The diffusion particles are PMMA with the particle size of 20 μm. The thickness of the prepared quantum dot layer is 150 μm. The waterproof layers are arranged on the upper and lower surface of the quantum dot layer, the waterproof layer is coating with protective coating layer. The waterproof layer is PVA coated high barrier film, the thickness of the waterproof layer is 100 μm. The material of the protective coating layer is acrylic resin, the thickness of the protective coating layer is 10-12 μm, the protective coating layer contains 5%-10% by weight of the diffusion particles with particle size of 5-10 μm.

Comparative Example 1

Provides a film applied to the backlight module, comprises, by weight, 15 parts of silica gel particles, 10 parts of diffusion particles, 100 parts of polystyrene resin. The particle size of said silica gel particles is 18 μm, the surface of the silica gel particle has micropore structure with the pore size of 15 nm. The diffusion particles are PMMA with the particle size of 20 μm. The thickness of the prepared film is 150 μm.

The resulting film does not contain quantum dots, and have poor color saturation.

Comparative Example 2

Provides a film applied to the backlight module, comprises, by weight, 2 parts of red light quantum dots, 8 parts of green light quantum dots, 10 parts of diffusion particles, 100 parts of polystyrene resin. The diffusion particles are PMMA with the particle size of 20 μm. The thickness of the prepared quantum dot layer is 150 μm. The waterproof layer are arranged on the upper and lower surface of the quantum dot layer, the waterproof layer is coating with protective coating layer. The waterproof layer is polyvinylidene chloride film, the thickness of the waterproof layer is 50 µm. The material of the protective coating layer is acrylic resin, the thickness of the protective coating layer is 10-12 µm, the protective coating layer contains 5% by weight of the diffusion particles with particle size of 5-10 µm, the diffusion particles are PMMA.

The resulting film does not contain silica gel particles, the luminous efficiency of the quantum dots is poor, and the color saturation is also low.

TABLE 1

The test result of the optical performance of the quantum dot film provided by the Examples and of the flim provided by the Comparative Examples

| Item | Brightness | NTSC |
|---|---|---|
| Example 1 | 1834 | 96% |
| Example 2 | 1765 | 94% |
| Example 3 | 1854 | 97% |
| Example 4 | 1652 | 89% |
| Example 5 | 1625 | 91% |
| Example 6 | 1654 | 92% |
| Example 7 | 1804 | 95% |
| Example 8 | 1823 | 97% |
| Example 9 | 1650 | 90% |
| Comparative Example 1 | 1821 | 68% |
| Comparative Example 2 | 1831 | 81% |

The test datas in table 1 show that, the quantum dot films applied to backlight module of the present invention have high NTSC value, good color saturation, and higher brightness. In particular, the quantum dot film applied to the backlight module provided in the Examples 1 to 3, Example 7 and 8, have higher NTSC value, better color saturation, and higher brightness.

The above are only preferred embodiments of the present invention, not intended to limit the scope of the present invention. All equalization changes and modifications according to the contents of the present invention, are encompassed within the patent scope of the present invention.

What is claimed is:

1. A quantum dot film for use in backlight module, comprising a quantum dot layer with an upper surface and a lower surface, an upper waterproof layer, and a lower waterproof layer, wherein the upper waterproof layer and the lower waterproof layer are arranged on the upper surface of the quantum dot layer and the lower surface of the quantum dot layer respectively; the quantum dot layer comprises, by weight, 100 parts of adhesives, 5-20 parts of silica gel particles, 1-20 parts of diffusion particles and 0.1-20 parts of quantum dots; the surfaces of the silica gel particles have micropore structures; the quantum dots are adsorbed in micropores of the silica gel particles or dispersed in the adhesives; the silica gel particles and the diffusion particles are dispersed in the adhesives.

2. The quantum dot film of claim 1, wherein the quantum dot material is selected from one kind of semiconductor material, or a mixture of two or more kinds of semiconductor materials.

3. The quantum dot film of claim 1, wherein the particle size of said silica gel particles is 2-30 µm, the pore size of the micropore structure on the surface of the silica gel particle is 10-30 nm, the particle size of the quantum dots is 1-20 nm.

4. The quantum dot film of claim 1, wherein the quantum dots comprise red light quantum dots and green light quantum dots, the weight ratio of the red light quantum dots and the green light quantum dots is 1:1-1:15.

5. The quantum dot film of claim 4, wherein the particle size range of the red light quantum dots is 6-9 nm, the particle size range of the green light quantum dots is 2-5 nm, the weight ratio of the red light quantum dots and the green light quantum dots is 2:7-2:9.

6. The quantum dot film of claim 1, wherein the diffusion particles are spherical or ellipsoid shape, the particle size range of the diffusion particles is 3-35 µm; the particle size of the diffusion particles is the same, or the variation coefficient of the particle size of the diffusion particles is less than or equal to 15%.

7. The quantum dot film of claim 1, wherein the thickness of the quantum dot layer is 10-200 µm.

8. A backlight module, wherein the backlight module comprises a quantum dot film of any of claims 1 to 7.

9. The backlight module of claim 8, wherein the upper surface of the upper waterproof layer is equipped with protective coating layer, anti-dazzle structure, prism structure or diffusion layer; the lower surface of the lower waterproof layer is also equipped with protective coating layer, the lower surface of this protective coating layer has irregular protrusions of 1-10 µm.

10. A method of preparing the quantum dot film of any of claims 1-7, wherein the method comprises the steps as below:
   (1) mixing the silica gel particles and quantum dots;
   (2) adding the mixture of silica gel particles and quantum dots obtained in step (1) into the adhesive to obtain an adhesive mixture, then adding diffusion particles into the adhesive mixture and further mixing to give an adhesive coating liquid;
   (3) applying the adhesive coating liquid obtained in step (2) onto the upper surface of the lower waterproof layer, which is cured to form a quantum dot layer;
   (4) bonding the upper waterproof layer onto the upper surface of the quantum dot layer.

* * * * *